United States Patent [19]
Wallace

[11] 3,865,048
[45] Feb. 11, 1975

[54] TRUCK BED TIE-DOWN ANCHORING DEVICE

[76] Inventor: Eugene L. Wallace, 3700 Georgetown St., N.E., Canton, Ohio 44721

[22] Filed: May 1, 1974

[21] Appl. No.: 465,796

[52] U.S. Cl.......................105/484 A, 296/28 M
[51] Int. Cl............................................ B61d 45/00
[58] Field of Search .. 296/28 M; 105/368 T, 369 A; 248/119 R, 361 R, 361 A; 287/20 R, 20.1

[56] References Cited
UNITED STATES PATENTS

| | | | |
|---|---|---|---|
| 3,163,462 | 12/1964 | Valesky | 105/369 A X |
| 3,494,587 | 2/1970 | Kuhn | 105/369 A X |
| 3,595,125 | 7/1971 | Jacobs | 105/369 A |

Primary Examiner—M. Henson Wood, Jr.
Assistant Examiner—Gene A. Church

[57] ABSTRACT

An anchoring device for fixed installation in association with a floor structure of a truck or like vehicle, as for anchoring attachment of a chain or like load binder device thereto, includes a rigid housing having passage therein between upper and lower ends of the same, and means for affixing the housing in association with a said floor structure to have an opening at upper end of the housing communicating with said passage. An anchoring element is axially shiftably received in said housing passage and has an outer cap on the upper end of same for downward stop engagement thereof with an outer stop seat on said upper end of the housing, in a retracted condition of the anchoring element within said passage. An inner stop seat provided on said housing, and downwardly spaced from said outer stop seat passage, is engageable by an inner stop member on the lower end of said anchoring element, anchoringly to limit axial withdrawal of said anchoring element when extended upwardly of said passage, as for anchoring attachment of the extended anchoring element to a said load binder means.

7 Claims, 3 Drawing Figures

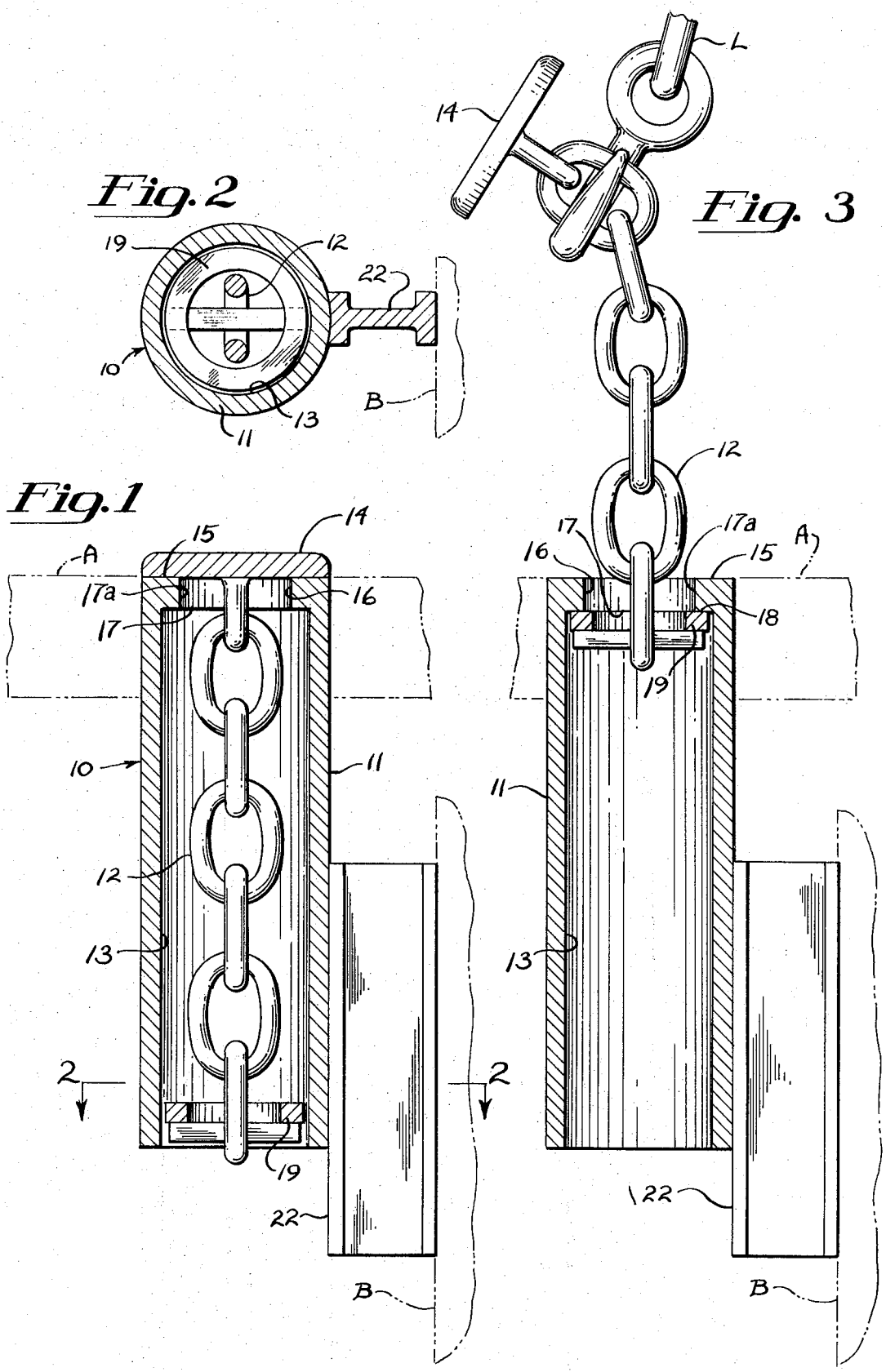

TRUCK BED TIE-DOWN ANCHORING DEVICE

BACKGROUND OF THE INVENTION

Heretofore various cargo tiedown anchoring devices of known related types have included, for example, a short tubular collar adapted to be secured to a truck or like vehicle floor, through which a link chain extended and was supported at its upper end by a cap closing the upper end of the collar, the exposed lower end of the chain being looped to have a lower end thereof anchored to an anchoring member affixed to the truck frame. This required provision of a number of extra chain links to form the loop and, accordingly, a number of the links were subject to possible damage by exposure to rain and snow from under the vehicle. In addition, the looped part of the chain was subject to becoming kinked, thereby to retard or block manual upward withdrawal of the chain through the tubular collar for use as a tiedown anchor,

SUMMARY OF THE INVENTION

The load binder anchoring device of the present invention may have a housing, such as a relatively short metal tube, provided with a lug or other means for fixed attachment of the same to a floor-supporting structure of a vehicle, to have the axis of the tube at a right angle to the vehicle floor, and to have the upper end of the tube communicating with the space above said floor. A length of link chain, slidably received through the housing passage, may have a closure cap flexibly affixed to the upper end thereof to be normally downwardly seated on the upper end of the tube, thereby to support the chain within the tube and at the same time protect it from being splashed with water and slush from underneath the vehicle. Moreover, the anchor chain, being maintained in straight unkinked condition when retracted, can be depended upon for efficient ready upward vertical withdrawal from the housing for load anchoring purposes.

One object of the invention is to provide a relatively simple truck bed tiedown anchoring device, which is economical to make and install in association with a truck floor, for example, and in which a flexible anchoring chain is maintained in straight unkinked condition at all times to assure free movement of the anchor chain between retracted and extended positions of use of the device.

Another object of the invention is to provide an anchoring device of the character described, wherein the anchoring chain is fully protected from exposure to the elements when not in use for load anchoring purposes.

Other objects and advantages of the invention will be apparent from the following description taken in conjunction with the accompanying drawings therein:

BRIEF DESCRIPTION OF THE DRAWINGS

FIG. 1 is a side elevation, partly in section and on a reduced scale, illustrating one embodiment of the improved vehicle load binder of the invention with an extendible anchor chain thereof in retracted position within a housing for the same, portions of a truck floor and framework being indicated by chain-dotted lines.

FIG. 2 is a horizontal cross-section taken on the line 2—2 of FIG. 1, and on the same scale as FIG. 1.

FIG. 3 is a view corresponding to FIG. 1, but illustrating the anchor chain extended from the housing to an anchored position in which it is anchoringly hitched to a load binder chain.

Referring to the drawings generally, and to FIGS. 1 and 2 in particular, the unitary tiedown anchoring device 10 is shown as including a rigid metal tube 11, which may be of axial length approximating the desired length of a link chain 12 adapted as shown in FIG. 1. In this way the chain 12 may be slidably suspended in a straight passage 13 through the tube, as by means of a disc-like closure or cap 14 pivotally connected to the uppermost chain link and adapted to be supported on an upwardly presented annular stop seat 15 at the upper end of the tube. In conjunction with this structure the upper end of the tube may have therein an inturned annular lip 16 defining an axially inwardly presented stop seat 17, below the seat 15, for purposes to be described later and at the same time defining the top opening 17a as being of sufficient diameter to permit free axial passage of the link chain 12 therethrough for purposes to be described later. The chain 12, as shown in FIG. 1, may have welded or otherwise affixed to a link at or near the lower end thereof, a circular or disc-like inner stop member 19 adapted upon upward withdrawal of the chain to be urged to stop engagement with the inwardly presented stop seat 18, as shown in FIG. 3. A suitable metal strip or bar 22 may be welded to the tubular housing 10, as shown, for fixed attachment to a floor supporting frame B, as shown in chain-dotted lines in FIGS. 1 and 3.

In use of the improved anchoring device vertically mounted in association with a floor A of a load carrying vehicle, a shown in FIG. 1, the anchor chain 12 when not in use is supported within the tubular housing 10 by the outer stop member on cap 14 to have the inner stop member 19 retained within the housing passage 13. In this condition of the link chain 12 it is self-operable by its own weight to remain straight and ready for instant retraction. When anchoring a load-binding element L about a load (not shown) on the vehicle floor, for example, the cap 14 is manually lifted upwardly until the inner stop member 19 engages the inwardly presented housing seat 18, as shown in FIG. 3, after which the thereby anchored chain 12 can be hitched or hooked to the load-binding element L. Upon subsequent release of the load-binding element L from the anchor chain 12, said chain is self-operating by its own weight to recede downwardly into the protective cover of the housing 10, where it is again supported and fully contained in straight, unkinked condition, as shown in FIG. 1.

The terms and expressions which have been used are used as terms of description and not of limitation, and there is no intention in the use of such terms and expressions of excluding any equivalents of any of the features shown or described or portions thereof, and it is recognized that various modifications are possible within the scope of the invention claimed.

What is claimed is:

1. An anchoring device for installation in a vehicle or like floor structure for anchoring attachment of a chain or like load-binder device thereto, comprising: a housing adapted for fixed attachment to a said floor structure and having a passage axially therethrough opening at an upper end of the housing; said housing having inwardly and outwardly presented stop seats with respect to said upper end thereof; and an elongated anchor element axially shiftably received in said passage and adapted to be freely passed through said upper end opening of the housing; and longitudinally spaced outer and inner portions of said element, with respect to said passage, having thereon spaced outer and inner stop members movable therewith for selective stop engagement with said outwardly and inwardly presented stop seats of said housing, respectively, in retracted and extended positions of the element with reference to said housing, the effective weight of said elongated element, in an axially vertically disposed condition of said housing, thereby tending to retract the elongated element into said passage to stop engagement of said outer stop member thereon with said inwardly presented stop seat of said housing, and said outer stop member being engageable as for manually drawing said link chain outwardly of said passage, toward anchoring stop engagement of said inner stop member of the same with said inwardly presented stop seat of said housing, for anchoring attachment of a thereby outwardly extended end portion of said element to a said load-binder device.

2. An anchoring device as in claim 1, said anchor element including a length of link chain.

3. An anchoring device as in claim 1, said upper stop member being a plate forming a cap for closing the upper end of said passage in the retracted position of said anchor element.

4. An anchoring device as in claim 3, said anchor element including link chain.

5. An anchoring device as in claim 4, said inwardly presented stop seat being closely adjacent said outwardly presented stop seat.

6. An anchoring device as in claim 5, the length of said element approximating the length of said housing.

7. An anchoring device as in claim 1, the required length of said element approximating the length of said passage below said upwardly presented stop seat, whereby the element, in said retracted position within said passage, is protected against undesirable external exposure.

* * * * *